(12) United States Patent
Pinarbasi

(10) Patent No.: US 7,414,817 B2
(45) Date of Patent: Aug. 19, 2008

(54) MAGNETORESISTIVE SENSOR HAVING A LAMINATED HARD MAGNET STRUCTURE FOR FREE LAYER BIASING

(75) Inventor: Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 460 days.

(21) Appl. No.: 11/053,629

(22) Filed: Feb. 7, 2005

(65) Prior Publication Data

US 2006/0176622 A1    Aug. 10, 2006

(51) Int. Cl.
*G11B 5/127* (2006.01)
(52) U.S. Cl. ................................. 360/324.12
(58) Field of Classification Search ............ 360/324.11, 360/324.12, 324.1, 324; 29/603.03, 603.08, 29/603.14, 603.16
See application file for complete search history.

(56) References Cited

U.S. PATENT DOCUMENTS

| | | | | |
|---|---|---|---|---|
| 5,708,358 | A | 1/1998 | Ravipati | 324/252 |
| 5,742,459 | A * | 4/1998 | Shen et al. | 360/327.32 |
| 5,784,224 | A | 7/1998 | Rottmayer et al. | 360/113 |
| 5,784,225 | A | 7/1998 | Saito et al. | 360/113 |
| 5,795,663 | A | 8/1998 | Koike et al. | 428/692 |
| 5,841,611 | A | 11/1998 | Sakakima et al. | 360/113 |
| 5,872,502 | A | 2/1999 | Fujikata et al. | 338/32 R |
| 6,385,017 | B1 | 5/2002 | Min et al. | 360/324.12 |
| 6,636,392 | B2 | 10/2003 | Ito et al. | 360/324.1 |
| 6,636,400 | B2 | 10/2003 | Pinarbasi et al. | 360/324.12 |
| 6,643,107 | B1 | 11/2003 | Hasegawa et al. | 360/324.11 |
| 6,663,987 | B2 | 12/2003 | Kakihara | 428/693 |
| 6,667,493 | B2 | 12/2003 | Ooshima | 257/49 |
| 6,668,443 | B2 | 12/2003 | Chien et al. | 29/603.18 |
| 6,690,554 | B2 | 2/2004 | Aoki et al. | 360/324.12 |
| 6,704,175 | B2 | 3/2004 | Li et al. | 360/324.11 |
| 6,707,649 | B2 | 3/2004 | Hasegawa et al. | 360/324.12 |
| 6,714,388 | B2 | 3/2004 | Hasegawa et al. | 360/324.11 |
| 6,783,874 | B2 | 8/2004 | Hasegawa et al. | 428/692 |
| 6,967,824 | B2 * | 11/2005 | Marinero | 360/324.12 |
| 2005/0180061 | A1 * | 8/2005 | Ding et al. | 360/324.12 |
| 2005/0275975 | A1 * | 12/2005 | Zhang et al. | 360/324.12 |
| 2006/0087772 | A1 * | 4/2006 | Pinarbasi | 360/324.12 |

* cited by examiner

*Primary Examiner*—Allen T Cao
(74) *Attorney, Agent, or Firm*—Zilka-Kotab, PC

(57) ABSTRACT

A magnetoresistive sensor having a novel laminated hard bias structure that possesses exceptional magnetic performance characteristics when deposited over a crystalline structure such as in a partial mill sensor design in which a portion of a sensor stack extends beyond the active area of the sensor. The hard bias structure may include a seed layer comprising a layer of Si sandwiched between layers of CrMo. The hard bias structure, which can be formed over the seed layer structure, includes layers of CoPt separated a layer of CrMo.

20 Claims, 4 Drawing Sheets

MAGNETORESISTIVE SENSOR HAVING A LAMINATED HARD MAGNET STRUCTURE FOR FREE LAYER BIASING

FIELD OF THE INVENTION

The present invention relates to free layer biasing in a magnetoresistive sensor, and more particularly to a seed layer for use with a bias layer formed over a crystalline structure.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk and when the disk rotates, air adjacent to the surface of the disk moves along with the disk. The slider flies on this moving air at a very low elevation (fly height) over the surface of the disk. This fly height is on the order of nanometers. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. This sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is biased parallel to the ABS, but is free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetic moments of the ferromagnetic layers of the pinned layer. A spin valve is also known as a top or bottom spin valve depending upon whether the pinning layer is at the top (formed after the free layer) or at the bottom (before the free layer).

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetic moment, when exchange coupled with a magnetic material, it can strongly pin the magnetization of the ferromagnetic layer.

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

As those skilled in the art will appreciate, the distance between the shields (gap thickness) determines the bit length for the read sensor. With the ever increasing pressure to increase data capacity and data rate, engineers are constantly under pressure to decrease the bit length (and therefore gap thickness) of read sensors. One way to decrease this gap thickness is by a partial mill process. Sensors have traditionally been constructed by depositing sensor layers as full film layers onto the first gap layer. A photoresist mask is then formed over the area that is to be the sensor and a material removal process such as ion milling is performed to remove material from the areas not covered by the mask. This material removal process has traditionally been performed down into the first gap layer, removing a portion of the first gap material at either side of the sensor.

Since this material removal process removes a portion of the first gap layer, it has been necessary to deposit a thick first gap layer in order prevent electrical shorts through the gap to the first shield. Such a short would be a catastrophic event that would render the sensor unusable. In these prior art heads, hard bias layers, constructed of a hard magnetic material such as CoPtCr have then been deposited over this etched out portion of the first gap layer at either side of the sensor to provide magnetic biasing to bias the magnetic moment of the free layer in the desired direction parallel with the ABS.

As discussed above, the removal of a portion of the first gap during formation of the sensor requires a larger overall gap thickness to prevent shorting. One way to overcome this is to use a partial mill process in which the material removal process (ie. ion milling) used to construct the sensor is terminated before all of the sensor material has been removed, such as when the material removal process has reached a point around the AFM layer (usually PtMn) near the bottom of the sensor. By stopping the milling process within the sensor layers, such as at the AFM layer no gap material is removed. This allows a much thinner gap to be deposited. The bias layers are then deposited on top of the remaining sensor layer rather than on the gap layer.

A problem that arises from such partial milling is that the bias layer properties are different when deposited over the AFM layer or other sensor layer than they are when deposited over the gap layer. The gap layer, usually $Al_2O_3$ is amorphous. It therefore has no crystalline structure to impart to the seed layer or to the hard bias material when the material is deposited onto the gap. Therefore, a hard bias structure deposited over the amorphous gap layer can exhibit a desired epitaxial growth that provides desired high retentive moment and high coercivity needed for free layer biasing.

However, the AFM layer, such as for example PtMn, as well as other sensor layers are not amorphous and exhibit their own grain structures. When the hard bias layers are deposited over the AFM layer, the grain structure of the underlying AFM layer carries through to the seed layer and hard bias layers. This grain structure being undesirable for optimal hard bias properties results in degraded biasing properties. This leads to free layer instability and associated signal noise. For example, depositing a CoPtCr hard magnetic material with a Cr seed layer over a PtMn substrate results in a CoPtCr hard bias layer with a coercivity of only around 600 Oe. This is much lower than the roughly 1400 Oe coercivity obtained when the same hard bias layer and seed are deposited on a glass (amorphous) substrate.

Yet another challenge to free layer biasing comes from the ever increasing demand for smaller track widths. As those skilled in the art will appreciate, a smaller track width means that more tracks of data can be fit onto a given disk. In order to achieve smaller track widths, sensors must be made ever narrower, and the spice heigh must be made accordingly smaller as well. This means that the free layer in a higher areal density device is stabilized by a smaller number of grains at the junction of the free layer and hard bias layer. One way to achieve improved free layer biasing and uniformity is to decrease the magnetic grain size of the material making up the hard bias layers, and therefore increase the number magnetic hard bias grains that are at the junction of the free layer. Decreasing the grain size decreases the chance that a given grain located near the free layer and having an improper magnetic orientation would have a sufficiently large effect on the free layer to degrade the free layer biasing. However, as discussed above, such a small magnetic grain structure must be able to be deposited on a crystalline structure in order to be used in a partial mill sensor design.

Therefore there is a strong felt need for a hard bias structure that can provide strong and uniform free layer biasing when deposited over a crystalline structure such as in a partial mill sensor design. Such a hard bias layer would preferably provide the effect of smaller grains structures in order to provide uniform, reliable biasing across the entire free layer.

SUMMARY OF THE INVENTION

The present invention provides a hard bias structure that exhibits exceptional magnetic properties when deposited on a crystalline structure such as in a partial mill sensor design. The hard bias structure includes layers of CoPt separated by layers of CrMo.

The hard bias layer may be formed on a seed layer, which may include first and second layers of CrMo separated from one another by a layer of Si. The hard bias layer may include two layers of CoPt, with a layer of CrMo sandwiched between them.

The multilayered lamination structure of the hard bias layer produces a hard bias structure having an advantageous small magnetic grain structure. By forming the bias structure as a multilayer structure, each layer of CoPt can be constructed sufficiently thin to prevent the growth of large individual magnetic grains.

A hard bias structure according to the present invention exhibits exceptional magnetic properties when deposited on a crystalline structure such as when deposited on sensor material in a partial mill sensor design. In fact when deposited on a crystalline layer, a hard bias structure according to the present invention has been found to have a coercivity of about 2058 Oersted and a squarenes ratio of 0.8.

These and other advantages and features of the present invention will be apparent upon reading the following detailed description in conjunction with the Figures.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
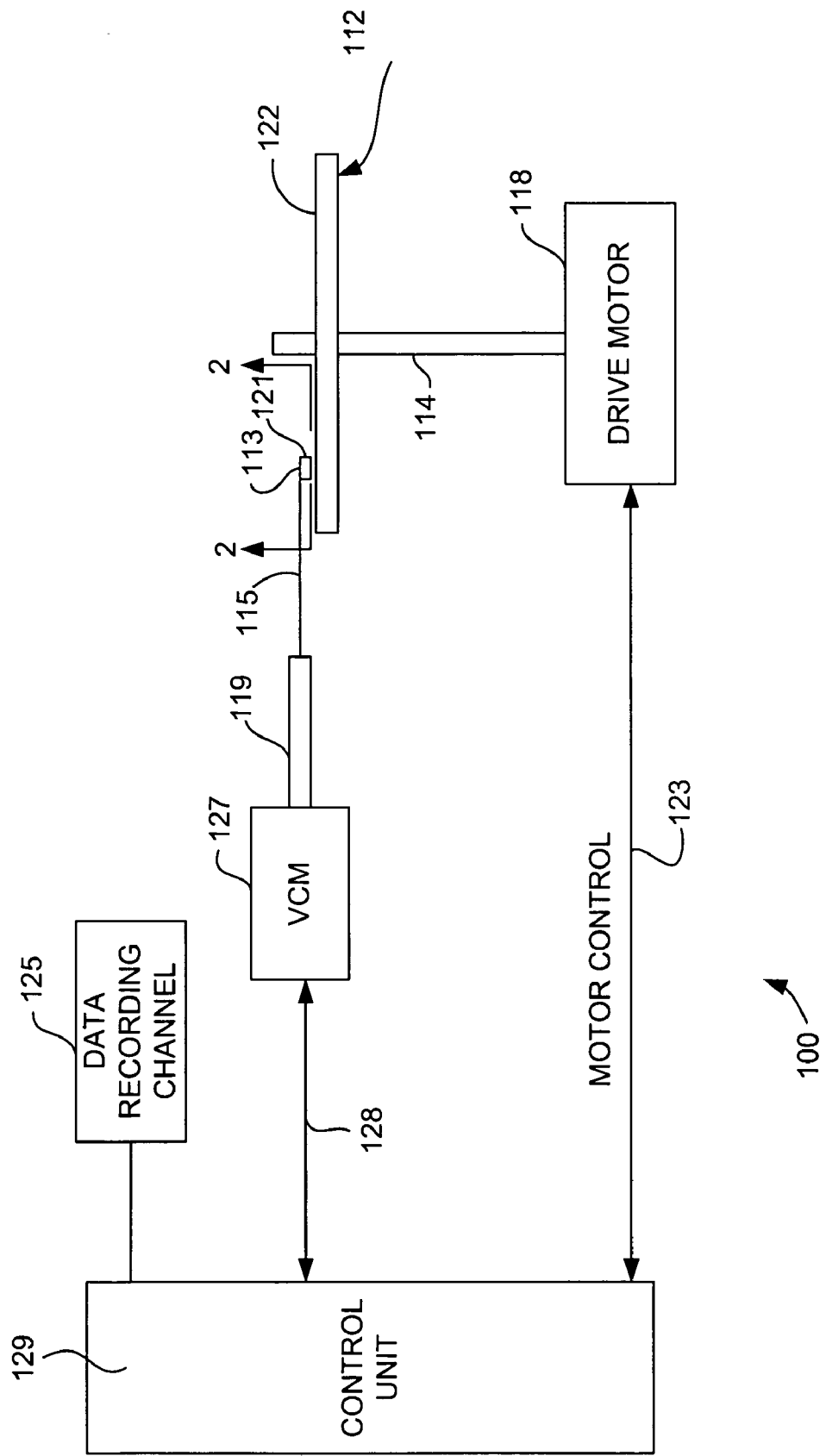
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
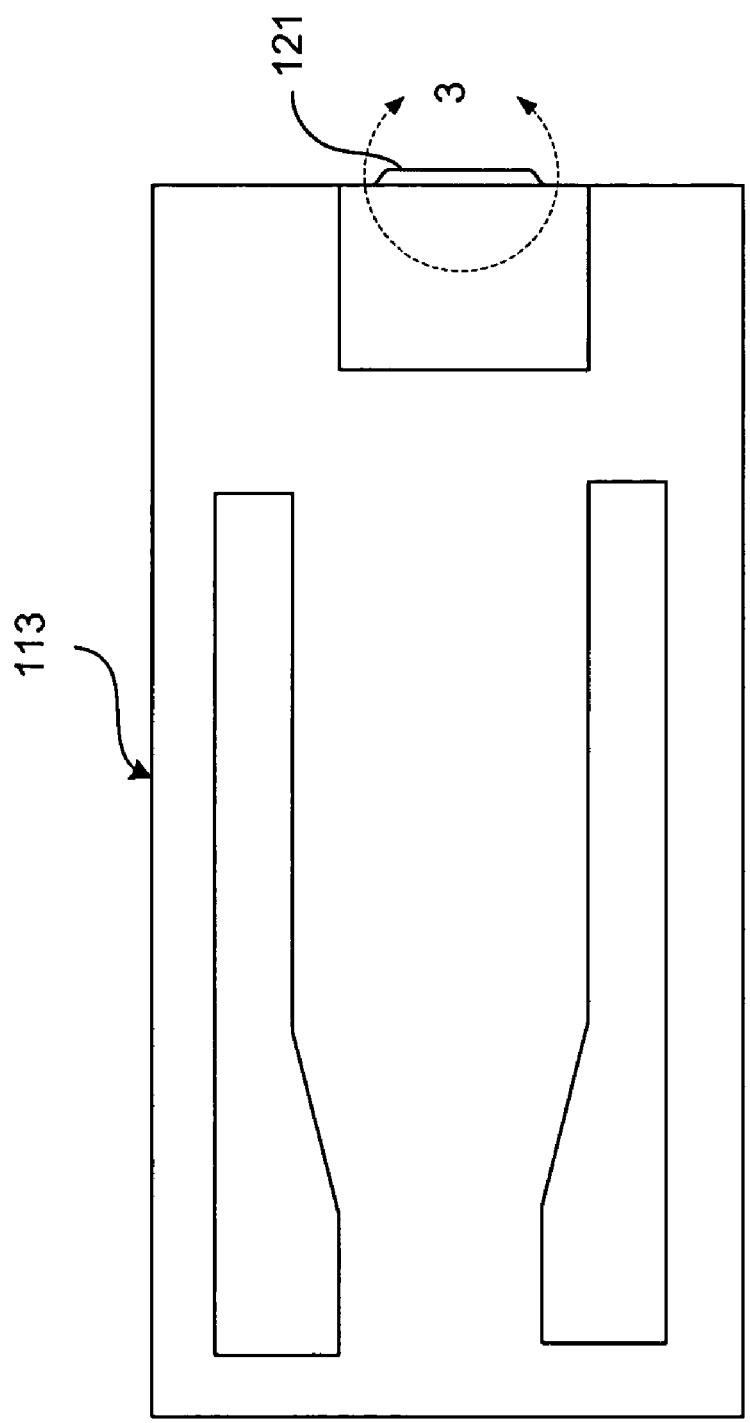
FIG. 2 is an ABS view of a slider, taken from line 3-3 of FIG. 2, illustrating the location of a magnetic head thereon.
Figure 3:
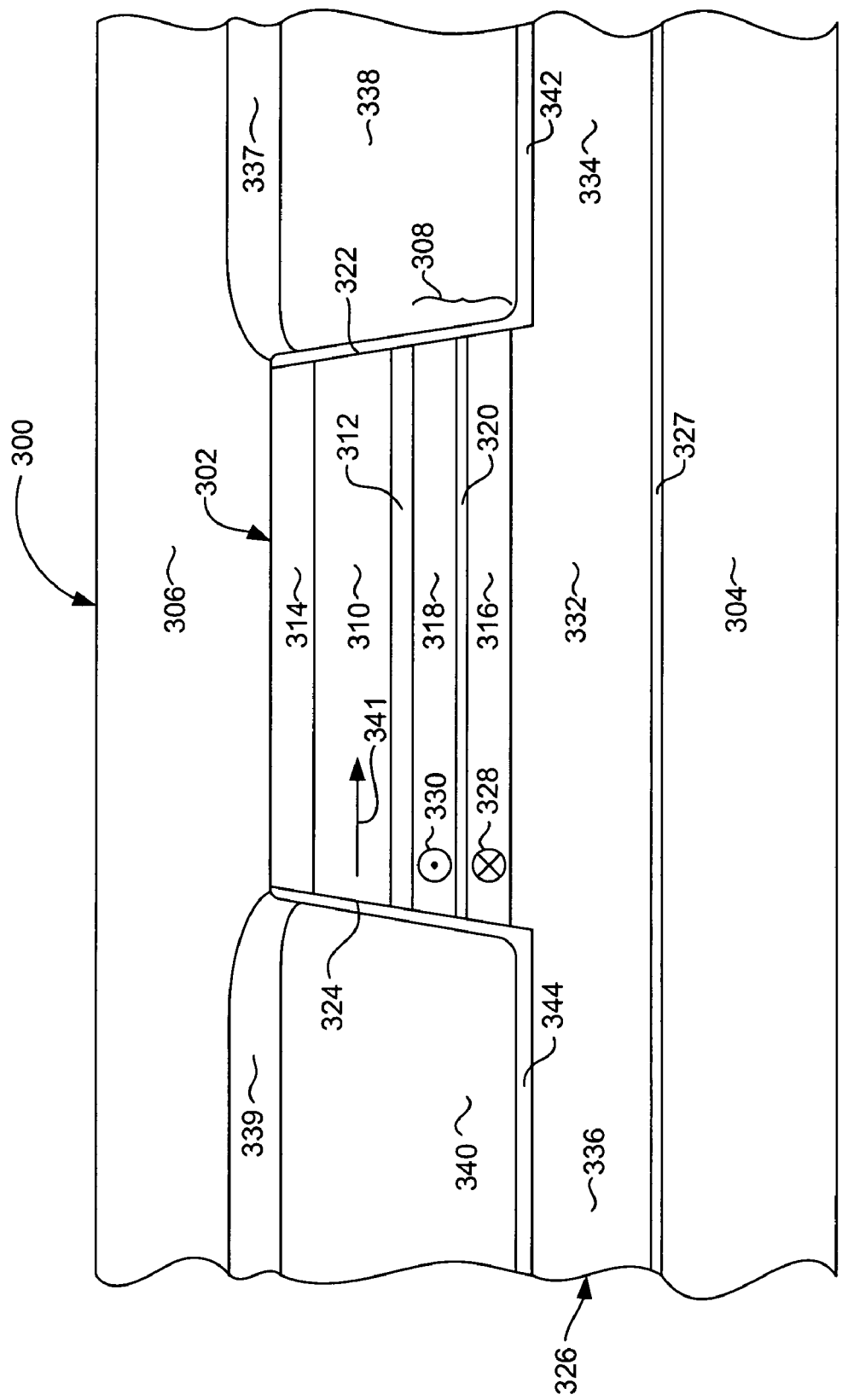
FIG. 3 is an ABS view of a magnetic sensor according to an embodiment of the present invention taken from circle 3 of FIG. 2.

With reference to FIG. 2, the orientation of the magnetic head 121 in a slider 113 can be seen in more detail. FIG. 3 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

With reference now to FIG. 3, a magnetoresistive sensor 300 according to an embodiment of the invention includes sensor stack 302 sandwiched between first and second gap layers 304, 306. The sensor stack 302 includes a magnetic pinned layer structure 308 and a magnetic free layer 310. A non-magnetic, electrically conductive spacer layer 312, such as Cu, is sandwiched between the free layer 310 and the pinned layer structure 308. A capping layer 314, such as Ta, may be provided at the top of the sensor stack 302 to protect the sensor from damage during manufacturing, such as from corrosion during subsequent annealing processes.

The pinned layer 308 can be a simple pinned structure or an antiparallel (AP) pinned structure and is preferably an AP pinned structure including first and second magnetic layers (AP1) 316, and (AP2) 318 which may be for example CoFe antiparallel coupled across a thin AP coupling layer 320 such as Ru. The free layer 310 can be constructed of various magnetic materials such as NiFe or CoFe, and may include layers of CoFe and NiFe, preferably with a layer of CoFe or Co adjacent to the spacer 312 for optimal sensor performance.

As can be seen with reference to FIG. 3, the sensor stack 302 has first and second laterally opposed side walls 322, 324 that define the track-width or active area of the sensor. A layer of antiferromagnetic material (AFM) 326, preferably PtMn, formed at the bottom of the sensor stack 302 is exchange coupled with the AP1 layer 316. The AFM layer, when exchange coupled with the AP1 layer 316 strongly pins the magnetic moment of the AP1 layer 316 as indicated by arrowhead 328. This in turn strongly pins the moment 330 of the AP2 layer 318 by antiparallel coupling across the AP coupling layer 320. Also as can be seen, the AFM layer 326 has a portion 332 that is disposed within the track width or active area of the sensor 300, but also has first and second laterally extending portions 334, 336 that extend laterally outward beyond the active area of the sensor 300. The AFM layer 326 may be formed on a seed layer 327 constructed of a material that is chosen to initiate a desired crystallographic structure in the AFM layer 326. The laterally extending portions 334, 336 may be slightly thinner than the inner portion 332 due to a partial milling process used to construct the sensor 300. It should be pointed out other sensor layers, such as the pinned layer 308 or spacer 312 could also extend beyond the active area of the sensor 300 as well. The extension of the AFM layer 326 alone is by way of example only. Alternatively, the partial mill process could be performed sufficiently to remove the AFM layer 326 outside of the sensor area, leaving just the seed layer 327 extending beyond laterally outward.

First and second hard bias layers 338, 340 extend laterally outward from the sides 322, 324 of the sensor stack 302. The hard bias layers 338, 340 are formed on seed layers 342, 344 and extend up the sides 322, 324 of the sensor stack 302, separating the hard bias layers 338, 340 from the sensor stack by a small distance. First and second leads 337, 339, which can comprise, for example Rh, are formed atop the hard bias layers 338, 340 to provide sense current to the sensor.

Figure 4:
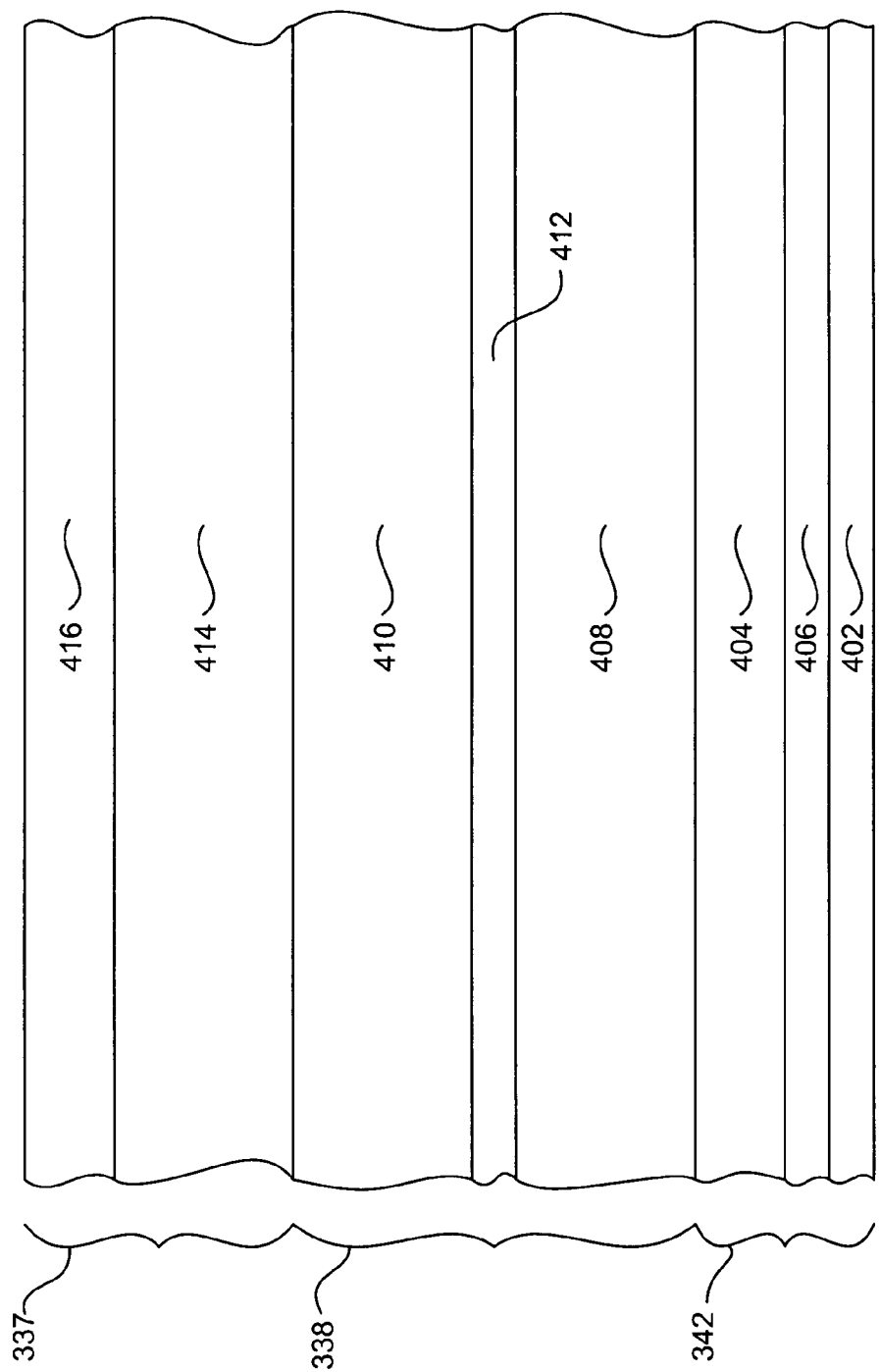
FIG. 4 is an expanded cross sectional view of a hard bias structure for use in the present invention.

With reference now to FIG. 4, the structure of the hard bias layers 338, 340 and seed layers 342, 344 are described in greater detail. While the description in FIG. 4 applies equally to the each hard bias layer 338, 340 and seed layer 342, 344, for purposes of clarity the hard bias layer will be referred to as hard bias layer 338 and the seed layer as 342. Also for purposes of clarity, the substrate on which the seed layer 342 and hard bias 338 are constructed is not shown in FIG. 4.

The seed layer 342 preferably includes first and second layers of CrMo 402, 404 with a layer of Si 406 sandwiched therebetween. The first layer of CrMo 402 preferably has a thickness of 5-20 Angstroms or about 10 Angstroms. The second layer of CrMo 404 preferably has a thickness of 25-100 Angstroms or about 50 Angstroms. The Si layer 406 sandwiched between the first and second CrMo layers 402, 404 preferably has a thickness of 5-20 Angstroms or about 10 Angstroms.

With continued reference to FIG. 4, the hard bias layer 338 includes a lamination of layers including a first layer of CoPt 408, a second layer of CoPt 410 and a layer of CrMo 412 sandwiched between the first and second layers of CoPt 408, 410. Each of the first and second layers of CoPt preferably has a thickness of 25-100 Angstroms. More preferably, each of the CoPt layers has a thickness of 30-70 Angstroms or about 50 Angstroms. The CrMo layer 412 sandwiched between the first and second CoPt layers preferably has a thickness of 2-20 Angstroms or more preferably 2-10 Angstroms or about 5 Angstroms.

With reference still to FIG. 4, the lead structure 337 is formed on top of the hard bias structure 338. This lead structure 337 can be constructed of many electrically conductive materials, including for example Au, or Cu. More preferably, though, the lead structure 337 includes a layer of Rh 414 and a layer of Ta 416 formed over the layer of Rh 414. The Rh layer 414 may have a thickness of 200-500 Angstroms or about 350 Angstroms. The Ta layer 416, which protects the Rh layer 414 during manufacture, may have a thickness of 10-100 Angstroms or about 20 Angstroms.

The multilayer hard bias structure 338 described above, provides the magnetic performance advantages of a hard bias structure having a small magnetic grain size. As discussed above, hard bias layers having small magnetic grain structures are preferred because they provide uniform, well controlled magnetic properties across the entire edge of the free layer, and therefore provide more stable, well controlled biasing. The multilayer, laminated structure described above achieves this advantage by limiting the size of the magnetic grains CoPt layers 408, 410 can grow.

The laminated, multilayer hard bias structure 338 also has the advantage that it can be deposited on a crystalline structure and still maintain excellent magnetic properties. This makes the hard bias structure 338 a perfect candidate for use in partial mill sensors in which the hard bias must be deposited on a crystalline structure such as an AFM layer, seed layer, pinned layer, etc. For example, When deposited on a crystalline AFM layer, the above described hard bias structure has been found to have a coercivity of about 2058 Oersted, and a squareness ratio of 0.8.

It should be pointed out that although the hard bias structure has been described as having two CoPt layers 408, 410 separated by a single layer of CrMo, the structure could have three or more layers of CoPt each separated from the other by a layer of CrMo. Therefore, the bi-layer CoPt hard bias structure described is for purposes of illustration only. It should also be pointed out that while the invention has been described as being embodied within a current in plane GMR structure, the invention could also be embodied in a current perpendicular to plane GMR sensor or in a tunnel valve sensor.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetoresistive sensor, comprising:
   a sensor stack including a free layer and having first and second lateral sides; and
   first and second hard bias structures extending laterally outward from the sides of the sensor stack, each of the first and second hard bias structures comprising first and second layers of CoPt and a layer of CrMo sandwiched between and contacting the first and second layers of CoPt.

2. A sensor as in claim 1, wherein the first and second layers of CoPt each have a thickness of 25-100 Angstroms.

3. A sensor as in claim 1, wherein the first and second layers of CoPt each have a thickness of 30-70 Angstroms.

4. A sensor as in claim 1, wherein the first and second layers of CoPt each have a thickness of about 50 Angstroms.

5. A sensor as in claim 1 wherein the layer of CrMo has a thickness of 2-20 Angstroms.

6. A sensor as in claim 1 wherein the layer of CrMo has a thickness of 2-10 Angstroms.

7. A sensor as in claim 1 wherein the layer of CrMo has a thickness of about 5Angstroms.

8. A magnetoresistive sensor, comprising:
   a sensor stack including a free magnetic layer and having first and second lateral sides;
   a seed layer contacting at least one of the first and second sides of the sensor stack and extending laterally outward therefrom, the seed layer comprising first and second layers of CrMo and a layer of Si sandwiched between the first and second layers of CrMo; and
   a hard bias structure formed upon the seed layer, the hard bias structure comprising first and second layers of CoPt and a third layer of CrMo sandwiched between the first and second layers of CoPt.

9. A sensor as in claim 8 wherein the first layer of CrMo has a thickness of 5-20 Angstroms, the second layer of CrMo has a thickness of 25-100 Angstroms and the layer or Si has a thickness of 5-20 Angstroms.

10. A sensor as in claim 8 wherein the first layer of CrMo has a thickness of about 10 Angstroms, the second layer of CrMo has a thickness of about 50 Angstroms and the Si layer has a thickness of about 10 Angstroms.

11. A sensor as in claim 8 wherein the first layer of CrMo has a thickness of 5-20 Angstroms, the second layer of CrMo has a thickness of 25-100 Angstroms, the layer or Si has a thickness of 5-20 Angstroms, the first and second layers of CoPt have each have a thickness of 25-100 Angstroms and the third CrMo layer has a thickness of 2-20 Angstroms.

12. A magnetoresistive sensor, comprising:
    a sensor stack having first and second sides; and
    a bias structure extending from a side of the sensor stack, the bias structure comprising alternating layers of CoPt and CrMo in contact with one another.

13. A magnetoresistive sensor as in claim 12 wherein each of the layers of CoPt has a thickness of 25-100 Angstroms and each layer of CrMo has a thickness of 2-20 Angstroms.

14. A magnetoresistive sensor, comprising:
    a sensor stack having first and second sides;
    a seed layer contacting at least one of the sides of the sensor stack and extending laterally outward therefrom, and
    a bias structure formed upon the seed layer, the bias structure comprising alternating layers of CoPt and CrMo in contact with one another.

15. A magnetoresistive sensor as in claim 14 wherein each of the layers of CoPt has a thickness of 25-100 Angstroms.

16. A magnetoresistive sensor, comprising:
    a sensor stack having first and second sides;
    a seed layer contacting at least one of the sides of the sensor stack and extending laterally outward therefrom, and
    a bias structure formed upon the seed layer, the bias structure comprising alternating layers of CoPt and CrMo in contact with one another, wherein the seed layer comprises a layer a layer of CrMo and a layer of Si.

17. A magnetoresistive sensor, comprising:
    a sensor stack having first and second side wall portions that define a sensor active area, a portion of the sensor stack extending beyond the sensor stack to form a laterally extending portion of the sensor stack; and
    a hard bias layer structure formed over the laterally extending portion of the sensor stack, the hard bias layer structure comprising first and second layers of CoPt and a layer of CrMo sandwiched between contacting the first and second layers of CoPt.

18. A magnetoresistive sensor, comprising:
    a sensor stack having first and second side wall portions that define a sensor active area, a portion of the sensor stack extending beyond the sensor stack to form a laterally extending portion of the sensor stack; and
    a seed layer formed over at least one of the first and second laterally extending portions of the sensor stack, the seed layer comprising a layer of CrMo and a layer of Si; and
    a hard bias structure formed over the seed layer, the hard bias layer comprising first and second layers of CoPt and a second layer of CrMo sandwiched between the first and second layers of CoPt.

19. A magnetoresistive sensor, comprising:
    a sensor stack having first and second side wall portions that define a sensor active area, a portion of the sensor stack extending beyond the sensor stack to form a laterally extending portion of the sensor stack; and
    a seed layer formed over at least one of the first and second laterally extending portions of the sensor stack, the seed layer comprising a first and second layers of CrMo and a layer of Si sandwiched between the first and second layers of CrMo; and
    a hard bias structure formed over the seed layer, the hard bias layer comprising first and second layers of CoPt and a third layer of CrMo sandwiched between the first and second layers of CoPt.

20. A disk drive system comprising:
a magnetic disk;
an actuator;
a slider connected with the actuator form movement adjacent to a surface of the disk; and
a magnetoresistive sensor connected with the slider, the magnetoresistive sensor comprising:
  a sensor stack including a free layer and having first and second lateral sides; and
  first and second hard bias structures extending laterally outward from the sides of the sensor stack, each of the first and second hard bias structures comprising first and second layers of CoPt and a layer of CrMo sandwiched between and contacting the first and second layers or CoPt.

* * * * *